July 26, 1960  H. KORTUM ET AL  2,946,129
MEASURING DEVICES
Filed Nov. 13, 1957

Inventors:
H. Kortum
K. Papello

United States Patent Office 2,946,129
Patented July 26, 1960

2,946,129
MEASURING DEVICES

Herbert Kortum and Karl Papello, Jena, Germany, assignors to VEB Carl Zeiss Jena, Jena, Germany Filed Nov. 13, 1957, Ser. No. 696,290

1 Claim. (Cl. 33—172)

This invention relates to a measuring device for direct micrometer measurement the index of which is fast with the mid-portion of a band-spring whose two end-portions lie under tension against the frame of the device and a contact member respectively.

In the known measuring devices of this kind, the contact member is mounted for axial displacement in a sleeve in which it is pressed downward by means of a spring. Constructions of this kind are not however very advantageous in that the contact member is often required to overcome considerable forces excluding the possibility particularly of micro-measurements, for instance the measurement of pressures. The said devices have moreover only a restricted measuring range and their accuracy of measurement can be increased only by complicated release and regulating means.

The present invention aims at overcoming the disadvantages of the prior proposed construction of measuring devices and to this end provides a measuring device for direct micrometer measurement having measuring elements consisting of two U-shaped band springs, the one of said springs carrying a pointer, the one end portions of said springs being attached to those sides of two parallel fixed guides which are opposite to each other, the other end portions of said springs lying against and supporting each other and constituting a tactile element.

Figure 2:
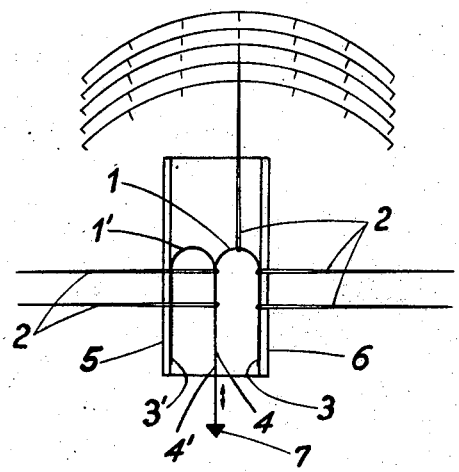
Figure 3:
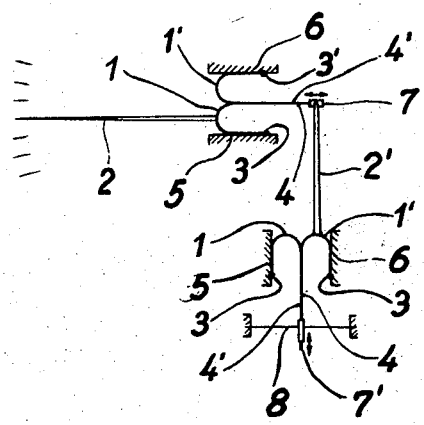
Figure 1:
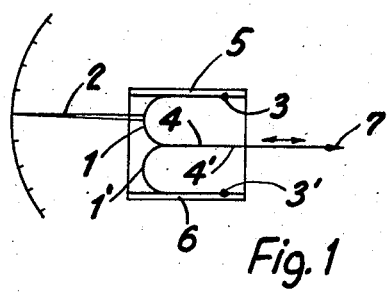

Figures 1 to 3 of the accompanying drawing illustrate schematically and by way of example, three embodiments of the invention, identical reference numerals being used to indicate like parts.

In the embodiment according to Fig. 1 two springs 1 and 1' are provided side by side one of which carries at its closed end the pointer 2. The outer limbs 3 and 3' of the two springs 1 and 1', respectively are attached to fixed guides 5 and 6, disposed parallel to each other, the adjacent limbs 4 and 4' lying so against each other as to bend the coil springs 1 and 1' to U-shape and to constitute a measuring or tactile element 7 a displacement of which causes the limbs 4 and 4' to roll on one another and the limbs 3 and 3' to roll on the inner sides of the guides 5 and 6, respectively.

To increase the measuring range of the device, one spring has, according to Fig. 2, five pointers which act in the different measuring ranges successively to each other, the reading scales being arranged according to the relative length displacement of the respective pointer.

According to the embodiment of Fig. 3 a measuring apparatus is provided in which a series connection of two or more devices according to Fig. 1 affords a further increase of the measuring accuracy, the measuring pointer 2' of the one device acting as transmission element on the tactile element 7 of the other, and the tactile element 7' of the said one device being guided by a flat spring 8. Such apparatus can therefore be used to advantage for measuring with utmost precision expansions of crystals due to magnetic or electrical forces or for testing minutely worked surfaces and the like. By connecting a potentiometer controlled by the pointer of the measuring apparatus, it is possible to obtain in a simple manner an electric distance transmission of the measured magnitudes.

We claim:

A measuring device for direct micrometer measurement having measuring elements consisting of two U-shaped band springs and two parallel fixed guides, the one ends of said springs being attached to those sides of said guides which are opposite to each other, the other ends of said springs lying against and supporting each other and constituting a tactile element, one of said springs carrying a pointer, said pointer being attached to the bowed part of said spring.

References Cited in the file of this patent

UNITED STATES PATENTS

| 2,208,635 | Johnson | July 23, 1940 |
| 2,305,731 | Palmgren | Dec. 22, 1952 |

FOREIGN PATENTS

| 104,495 | Sweden | May 12, 1942 |